(12) United States Patent
Weiss et al.

(10) Patent No.: US 11,292,618 B2
(45) Date of Patent: Apr. 5, 2022

(54) NONLINEAR MODEL PREDICTIVE CONTROL OF COUPLED CELESTIAL SYSTEM

(71) Applicant: Mitsubishi Electric Research Laboratories, Inc., Cambridge, MA (US)

(72) Inventors: Avishai Weiss, Cambridge, MA (US); Stefano Di Cairano, Somerville, MA (US); BharaniPrabha Malladi, Tucsan, AZ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 456 days.

(21) Appl. No.: 16/502,186

(22) Filed: Jul. 3, 2019

(65) Prior Publication Data
US 2021/0002005 A1 Jan. 7, 2021

(51) Int. Cl.
*B64G 1/24* (2006.01)
*B64G 1/10* (2006.01)
*B64G 1/40* (2006.01)

(52) U.S. Cl.
CPC .......... *B64G 1/242* (2013.01); *B64G 1/1078* (2013.01); *B64G 1/40* (2013.01)

(58) Field of Classification Search
CPC ........ B64G 1/242; B64G 1/1078; B64G 1/40; B64G 1/36; B64G 1/244; B64G 1/26; B64G 1/646; B64G 2001/245
See application file for complete search history.

(56) References Cited

U.S. PATENT DOCUMENTS

| | | | | |
|---|---|---|---|---|
| 6,023,291 A * | 2/2000 | Kamel | ................. | G01C 11/025 348/116 |
| 6,272,432 B1 * | 8/2001 | Li | .......................... | B64G 1/288 701/501 |
| 6,524,112 B1 * | 2/2003 | Kiel | ....................... | G09B 27/08 434/287 |
| 6,999,860 B2 * | 2/2006 | Belbruno | ............... | B64G 1/007 701/13 |

(Continued)

FOREIGN PATENT DOCUMENTS

| | | | | |
|---|---|---|---|---|
| WO | WO-2016172647 A1 * | 10/2016 | ............. | E21C 51/00 |
| WO | WO-2018030367 A1 * | 2/2018 | ............. | B64G 1/641 |
| WO | WO-2019018826 A1 * | 1/2019 | ............... | B64G 1/40 |

*Primary Examiner* — Behrang Badii
*Assistant Examiner* — Jalal C Coduroglu
(74) *Attorney, Agent, or Firm* — Gennadiy Vinokur; Hironori Tsukamoto

(57) ABSTRACT

A controller controls a spacecraft to rendezvous a non-center-of-mass point of the controlled spacecraft with a non-center-of-mass point of an uncontrolled celestial body. The controlled spacecraft and the uncontrolled celestial body form a multi-object celestial system, and the controller produces control commands to thrusters of the controlled spacecraft using a non-linear model predictive control (NMPC) optimizing a cost function over a receding horizon that minimizes an error between coordinates of the non-center-of-mass point of the spacecraft and the non-center-of-mass point of the celestial body subject to joint dynamics of the multi-object celestial system coupled with joint kinematics of the multi-object celestial system.

15 Claims, 9 Drawing Sheets

(56) References Cited

U.S. PATENT DOCUMENTS

| | | | | |
|---|---|---|---|---|
| 8,134,499 | B2* | 3/2012 | Wang | G01C 21/165 |
| | | | | 342/357.3 |
| 2002/0182576 | A1* | 12/2002 | Kiel | G09B 27/08 |
| | | | | 434/278 |
| 2003/0186205 | A1* | 10/2003 | Kiel | G09B 27/08 |
| | | | | 434/290 |
| 2008/0059009 | A1* | 3/2008 | Fedora | G01C 21/24 |
| | | | | 701/13 |
| 2009/0254278 | A1* | 10/2009 | Wang | G01S 19/215 |
| | | | | 701/472 |
| 2009/0278736 | A1* | 11/2009 | Cohen | G01S 19/14 |
| | | | | 342/357.55 |
| 2011/0275408 | A1* | 11/2011 | Kulik | G01C 17/38 |
| | | | | 455/556.1 |
| 2016/0131751 | A1* | 5/2016 | Mathews | G01S 11/10 |
| | | | | 342/461 |
| 2016/0282123 | A1* | 9/2016 | McCroskey | B64G 1/36 |
| 2017/0036783 | A1* | 2/2017 | Snyder | B29C 64/118 |
| 2018/0232557 | A1* | 8/2018 | Chang | G06T 7/215 |
| 2018/0251240 | A1* | 9/2018 | Reitman | B64G 1/40 |
| 2019/0049998 | A1* | 2/2019 | Weiss | B64G 1/26 |
| 2019/0049999 | A1* | 2/2019 | Weiss | B64G 1/28 |
| 2019/0248515 | A1* | 8/2019 | Hakamada | B64G 9/00 |
| 2020/0223562 | A1* | 7/2020 | Reitman | B64G 4/00 |
| 2020/0256678 | A1* | 8/2020 | Li | G01C 21/165 |
| 2021/0002005 | A1* | 1/2021 | Weiss | B64G 1/244 |
| 2021/0078732 | A1* | 3/2021 | Reitman | B64G 1/26 |
| 2021/0237909 | A1* | 8/2021 | Nicholson | B64G 1/40 |

* cited by examiner

NONLINEAR MODEL PREDICTIVE CONTROL OF COUPLED CELESTIAL SYSTEM

TECHNICAL FIELD

The present disclosure relates generally to controlling an operation of a spacecraft, and more particularly to spacecraft rendezvous to uncooperative, uncontrolled and potentially tumbling celestial bodies via nonlinear model predictive control (NMPC) over a receding horizon, that attains 6-degree-of-freedom relative pose regulation.

BACKGROUND

Rendezvous to an uncooperative, tumbling celestial body presents several challenges. The dynamics of the uncontrolled celestial body and a controlled chaser spacecraft are nonlinear—both the rotational attitude dynamics with potentially large angular velocities, and the translational orbital dynamics in arbitrary orbits. Additionally, full 6 degree-of-freedom (DOF) rigid body models are necessary to describe relative rotational and translational motion between the uncontrolled celestial body and controlled spacecraft for rendezvous maneuvers that include an alignment between robotic graspers and surface rocks.

Graspers and rocks are generally not located at the centers of mass of their respective bodies resulting in a complex kinematic and dynamic relationship. Furthermore, there are often restrictions on the placement of thrusters on a spacecraft so that antennas and solar panels may be deployed without the risk of thruster plume impingement. Restricting the placement of thrusters can preclude the thrusters from providing pure torques without also applying a net force on the satellite. Therefore, firing the thrusters may affect the spacecraft position and orientation (pose), introducing additional dynamic coupling between rotation and translation.

As a result, current methods to handle such rendezvous use open-loop trajectory design based on inverse kinematic maps and then employ a suboptimal closed-loop trajectory tracking scheme. This partial open loop method requires simulations done on earth, and is not fully generalizable to arbitrary maneuvers.

Therefore, a need exists in the art for an improved way to control an operation of a spacecraft, for kinematically and dynamically coupled rotational-translational spacecraft relative motion. For future autonomous spacecraft operation that is robust and requires less development time, full closed-loop regulation methods, as opposed to open-loop trajectory geneation and tracking, are necessary.

SUMMARY

Embodiments of the present disclosure are directed to controlling the operation of a spacecraft with kinematically and dynamically coupled rotational-translational relative motion with respect to uncontrolled celestial body by using a nonlinear model predictive control (NMPC) optimizing a cost function over a finite receding horizon. Some embodiments are based on recognition that the NMPC can provide a close-loop control of a spacecraft to rendezvous with an uncontrolled celestial body. Such a close-loop NMPC can replace open-loop tracking requiring external simulation, use feedback signals to account for uncertainties, and consider constraints of spacecraft control.

To replace open-loop tracking with close-loop feedback optimization, some embodiments formulate a rendezvous control problem as a regulation problem that minimizes an error between coordinates of a non-center-of-mass point of the spacecraft and a non-center-of-mass point of the celestial body. Direct consideration of non-center-of-mass points simplifies cost function formulation, but adds additional complexity of the non-center-of-mass control. To address this complexity, some embodiments join the spacecraft and the celestial body in a multi-object celestial system and minimize the error coordinates subject to joint dynamics of the multi-object celestial system coupled with joint kinematics of the multi-object celestial system. In effect, this reformulation allows to use feedback optimization of a multi-object celestial system as a single system under control.

In addition, some embodiments are based on realization that in this multi-object celestial system, only spacecraft can be controlled, while the other celestial body is uncontrolled. To handle this constraint, some embodiments embed the dynamics and kinematics of the uncontrolled celestial body into the dynamics and kinematics of the controlled spacecraft. Such an embedding represents joint dynamics and kinematics of a relative attitude-error and a relative translational-error between the controlled spacecraft and the uncontrolled celestial body allowing to form the joint multi-object celestial system controllable via the NMPC as a closed-loop regulation problem of the error coordinates between the non-center-of-mass point on the controlled spacecraft and the non-center-of-mass point on the uncontrolled celestial body.

Combination of regulation, multi-object celestial system, coupling and/or embedding of dynamics and kinematics allows to solve the rendezvous control problem in a close-loop manner. To that end, some embodiments provide that the NMPC can produce a solution for controlling the thrusters of the spacecraft via a thruster controller, by optimizing a cost function over a finite receding horizon using a model of the dynamics of the spacecraft that affects a pose of the spacecraft.

One exemplar embodiment considers rendezvous of a controlled chaser spacecraft, equipped with a robotic grasper, to an uncontrolled asteroid surface to collect a sample rock. Because both the robotic grasper on the controlled chaser spacecraft and the surface rock on the asteroid are located at non-center-of-mass points of their respective bodies, it is necessary to simultaneously consider the entire 6-degree-of-freedom (6-DOF) pose of each body, i.e. translational configuration and rotational configuration of each body, when performing rendezvous. Classical rendezvous applications do not consider non-center-of-mass points, and, thus, just the translational configuration is sufficient. However, 6-DOF mathematical descriptions of the non-center-of-mass points exhibit kinematic coupling, e.g. the orientation of the spacecraft affects the spatial position of the non-center-of-mass point. The spatial position of the non-center-of-mass point is therefore a combination of the rotational motion of the spacecraft and the translational motion of the spacecraft in its orbit. Similarly, the motion description of a rock on the surface of an asteroid also exhibits this same kinematic coupling.

According to one non-limiting embodiment, the controlled chaser spacecraft is actuated by eight gimbaled thrusters, each producing a force to change the position of the spacecraft as well as a torque to rotate the spacecraft. Because the thrusters affect both the rotational and translational motion of the spacecraft, the mathematical descriptions of the full 6-DOF motion exhibits dynamic coupling.

According to an embodiment of the present disclosure, the objective is to rendezvous a non-center-of-mass point on a controlled chaser spacecraft with a non-center-of-mass point on an uncontrolled celestial body. In this disclosure, the spacecraft under control is also referred as a controlled spacecraft or chaser spacecraft to indicate the objective of control. Similarly, the uncontrolled celestial body is also referred as a target, i.e., the body to be chased.

It is a realization of some embodiments that in order to form a closed-loop control regulation method that is robust to disturbances or changes in the motion of the controlled and uncontrolled bodies, as opposed to an open-loop trajectory design based on inverse kinematic maps and suboptimal closed-loop trajectory tracking scheme, there is a need to merge the dynamics and kinematics of the controlled chaser spacecraft with the dynamics and kinematics of the uncontrolled celestial body so that they form a joint multi-object celestial system that is amenable to regulation control via NMPC.

Furthermore, because one of the bodies of the multi-object celestial system is uncontrolled, the appropriate description of the joint multi-object celestial system is the embedding of the uncontrolled dynamics and kinematics into the controlled dynamics and kinematics. According to an embodiment, the embedding of the uncontrolled dynamics and kinematics into the controlled dynamics and kinematics is achieved by formulation of the rendezvous problem using error coordinates directly between the non-center-of-mass point on the controlled chaser spacecraft and the non-center-of-mass point on the celestial body. The error coordinate formulation defines the motion of the multi-object celestial system as a relative motion model, i.e. a model of the motion of the controlled chaser spacecraft relative the uncontrolled celestial body. Using the error coordinate formulation with the uncontrolled dynamics and kinematics embedded into the controlled dynamics and kinematics enables us to cast the problem as a closed-loop regulation control, solvable via NMPC.

According to an embodiment of the present disclosure, the objective of the NMPC policy is for the controlled chaser spacecraft and its non-center-of-mass robotic grasper to follow the uncontrolled body's orientation, angular velocity, and orbital position and velocity of the non-center-of-mass rock on the surface, i.e., the objective of the NMPC policy is the regulation of the error coordinate formulation of the joint multi-object celestial system.

By using NMPC with a cost function and constraints that exploits a model of the joint multi-object celestial system, some embodiments can also satisfy additional constraints on the motion of the controlled chaser spacecraft. For example, some embodiments allow satisfaction of the dynamic coupling induced by the eight gimbaled thrusters by using input constraints in order to satisfy gimbal angle limits and magnitude limits on the thrusters. Additionally, output constraints can be included to ensure that the controlled chaser spacecraft's robotic grasper approaches the uncontrolled body's surface rock via a line-of-sight (LOS) constraint.

Accordingly, one embodiment discloses a controller to control a spacecraft to rendezvous a non-center-of-mass point of the controlled spacecraft with a non-center-of-mass point of an uncontrolled celestial body, wherein the controlled spacecraft and the uncontrolled celestial body form a multi-object celestial system. The controller includes an input interface configured to accept data indicative of current values of states of the controlled spacecraft and the uncontrolled celestial body in the multi-object celestial system, wherein the states includes one or combination of positions, orientations, and translational and angular velocities of the controlled spacecraft and the uncontrolled celestial body, and perturbations acting on the multi-object celestial system; a processor configured to produce control commands to thrusters of the controlled spacecraft using a non-linear model predictive control (NMPC) optimizing a cost function over a receding horizon that minimizes an error between coordinates of the non-center-of-mass point of the spacecraft and the non-center-of-mass point of the celestial body subject to joint dynamics of the multi-object celestial system coupled with joint kinematics of the multi-object celestial system; and an output interface configured to submit the control commands to the thrusters of the spacecraft.

Another embodiment discloses a method for controlling a spacecraft to rendezvous a non-center-of-mass point of the controlled spacecraft with a non-center-of-mass point of an uncontrolled celestial body, wherein the controlled spacecraft and the uncontrolled celestial body form a multi-object celestial system, wherein the method uses a processor coupled with stored instructions implementing the method, wherein the instructions, when executed by the processor carry out steps of the method including accepting data indicative of current values of states of the controlled spacecraft and the uncontrolled celestial body in the multi-object celestial system, wherein the states includes one or combination of positions, orientations, and translational and angular velocities of the controlled spacecraft and the uncontrolled celestial body, and perturbations acting on the multi-object celestial system; producing control commands to thrusters of the controlled spacecraft using a non-linear model predictive control (NMPC) optimizing a cost function over a receding horizon that minimizes an error between coordinates of the non-center-of-mass point of the spacecraft and the non-center-of-mass point of the celestial body subject to joint dynamics of the multi-object celestial system coupled with joint kinematics of the multi-object celestial system; and submitting the control commands to the thrusters of the spacecraft.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
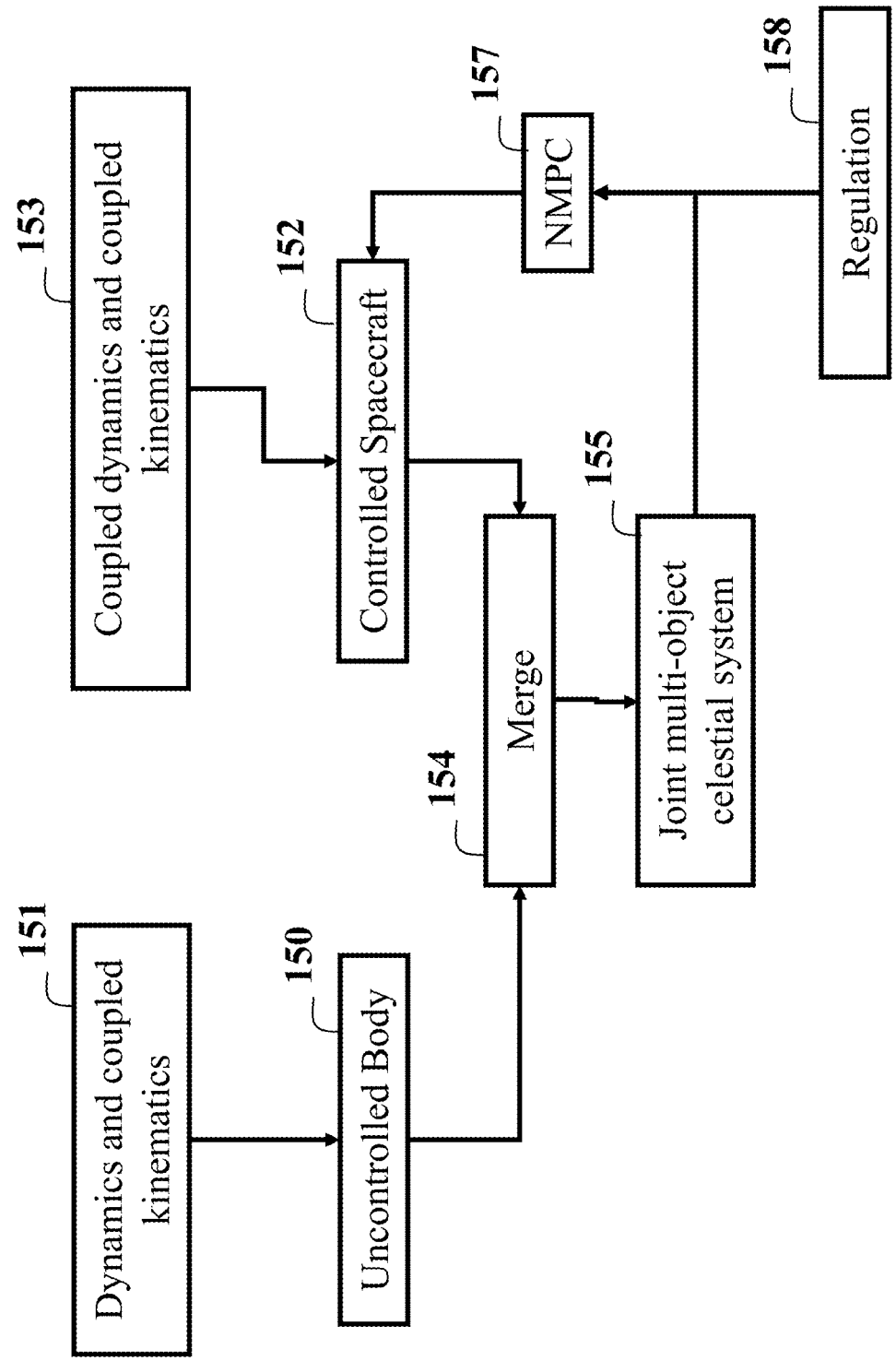
FIG. 1A is a schematic of forming a close-loop feedback optimization for a rendezvous control according to some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

System Overview

Some embodiments are directed to controlling the operation of a spacecraft with kinematically and dynamically coupled rotational-translational relative motion by using a nonlinear model predictive control (NMPC) optimizing a cost function over a finite receding horizon. Some embodiments use the NMPC to produce a solution for controlling the thrusters of the spacecraft via a thruster controller, by optimizing a cost function over a finite receding horizon using a model of the dynamics of the spacecraft that affects a pose of the spacecraft.

For example, one embodiment discloses a system and a method of rendezvous of a controlled chaser spacecraft, equipped with a robotic grasper, to an uncontrolled asteroid surface to collect a sample rock. Because both the robotic grasper on the controlled chaser spacecraft and the surface rock on the asteroid are located at non-center-of-mass points of their respective bodies, the embodiments simultaneously consider the entire 6-degree-of-freedom (6-DOF) pose of each body, i.e. translational configuration and rotational configuration of each body, when performing rendezvous. Furthermore, 6-DOF mathematical descriptions of the non-center-of-mass points exhibit kinematic coupling, e.g. the orientation of the spacecraft affects the spatial position of the non-center-of-mass point. The spatial position of the non-center-of-mass point is therefore a combination of the rotational motion of the spacecraft and the translational motion of the spacecraft in its orbit. Similarly, the motion description of a rock on the surface of an asteroid also exhibits this same kinematic coupling.

In exemplar embodiment, the controlled chaser spacecraft is actuated by eight gimbaled thrusters, each producing a force to change the position of the spacecraft as well as a torque to rotate the spacecraft. Because the thrusters affect both the rotational and translational motion of the spacecraft, the mathematical descriptions of the full 6-DOF motion exhibits dynamic coupling.

The objective of some embodiments is to rendezvous a non-center-of-mass point on a controlled chaser spacecraft with a non-center-of-mass point on an uncontrolled celestial body. It is a realization of some embodiments that in order to form a closed-loop control regulation method that is robust to disturbances or changes in the motion of the controlled and uncontrolled bodies, as opposed to an open-loop trajectory design based on inverse kinematic maps and suboptimal closed-loop trajectory tracking scheme, there is a need to merge the dynamics and kinematics of the controlled chaser spacecraft with the dynamics and kinematics of the uncontrolled celestial body so that they form a joint multi-object celestial system that is amenable to regulation control via NMPC.

Furthermore, because one of the bodies of the multi-object celestial system is uncontrolled, the appropriate description of the joint multi-object celestial system is the embedding of the uncontrolled dynamics and kinematics into the controlled dynamics and kinematics. According to an embodiment, the embedding of the uncontrolled dynamics and kinematics into the controlled dynamics and kinematics is achieved by formulation of the rendezvous problem using error coordinates directly between the non-center-of-mass point on the controlled chaser spacecraft and the non-center-of-mass point on the celestial body. The error coordinate formulation defines the motion of the multi-object celestial system as a relative motion model, i.e. a model of the motion of the controlled chaser spacecraft relative the uncontrolled celestial body. Using the error coordinate formulation with the uncontrolled dynamics and kinematics embedded into the controlled dynamics and kinematics enables us to cast the problem as a closed-loop regulation control, solvable via NMPC.

FIG. 1A shows a schematic of forming a close-loop feedback optimization for a rendezvous control according to some embodiments. To replace open-loop tracking with close-loop feedback optimization, some embodiments formulate a rendezvous control problem as a regulation problem 158 that minimizes an error between coordinates of a non-center-of-mass point of the spacecraft and a non-center-of-mass point of the celestial body. Direct consideration of non-center-of-mass points simplifies cost function formulation, but adds additional complexity of the non-center-of-mass control. To address this complexity, some embodiments merge 154 dynamics and kinematics of the spacecraft and the celestial body in a multi-object celestial system 155 and minimize the error coordinates of regulation 158 subject to joint dynamics of the multi-object celestial system coupled with joint kinematics of the multi-object celestial system. In effect, this reformulation allows the NMPC 157 to use feedback optimization of a multi-object celestial system as a single system under control.

In addition, some embodiments are based on realization that in this multi-object celestial system, only spacecraft 152 can be controlled, while the other celestial body 150 is uncontrolled. To handle this constraint, some embodiments couple, e.g., embed, the dynamics and kinematics 151 of the uncontrolled celestial body into the dynamics and kinematics 153 of the controlled spacecraft. Such an embedding represents joint dynamics and kinematics of multi-object celestial system 155 as a relative attitude-error and a relative translational-error between the controlled spacecraft and the uncontrolled celestial body. The multi-object celestial system dynamics forms the model used in the NMPC 157 to calculate the current control input which is subsequently applied to the controlled chaser spacecraft 152 in order to affect a motion of the spacecraft 152 to rendezvous with the uncontrolled celestial body 150. The dynamic and kinematic models 151 and 153 are typically known and determined in advance.

Figure 1B:
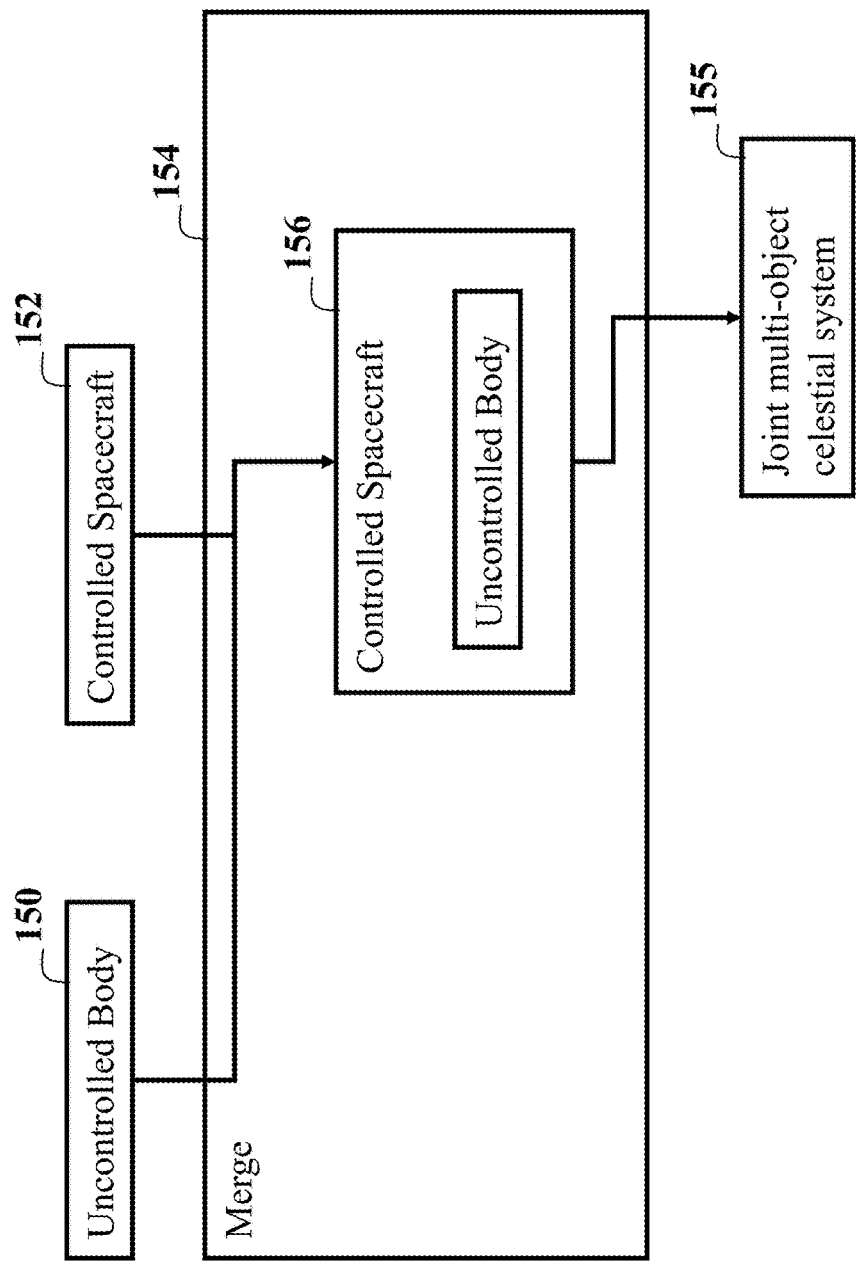
FIG. 1B is a block diagram illustrating the implementation of the merging of FIG. 1A according to one embodiment.

FIG. 1B is a block diagram illustrating the implementation of the merging 154 of FIG. 1A according to one embodiment. The embodiment, in order to control both the uncontrolled body 150 and the controlled chaser spacecraft 152 to rendezvous their respective non-center-of-mass points the via closed-loop regulation in NMPC 157, merges 154 the uncontrolled body 150 with the controlled chaser spacecraft 152 into a joint multi-object celestial system 155.

In the embodiment, the dynamics and kinematics of the uncontrolled body 150 are embedded into the dynamics and kinematics of the controlled chaser spacecraft 156 forming a joint multi-object celestial system 155 that is controllable via NMPC as a closed-loop regulation problem of the error coordinates between the non-center-of-mass point on the controlled chaser spacecraft and the non-center-of-mass point on the celestial body.

Figure 1C:
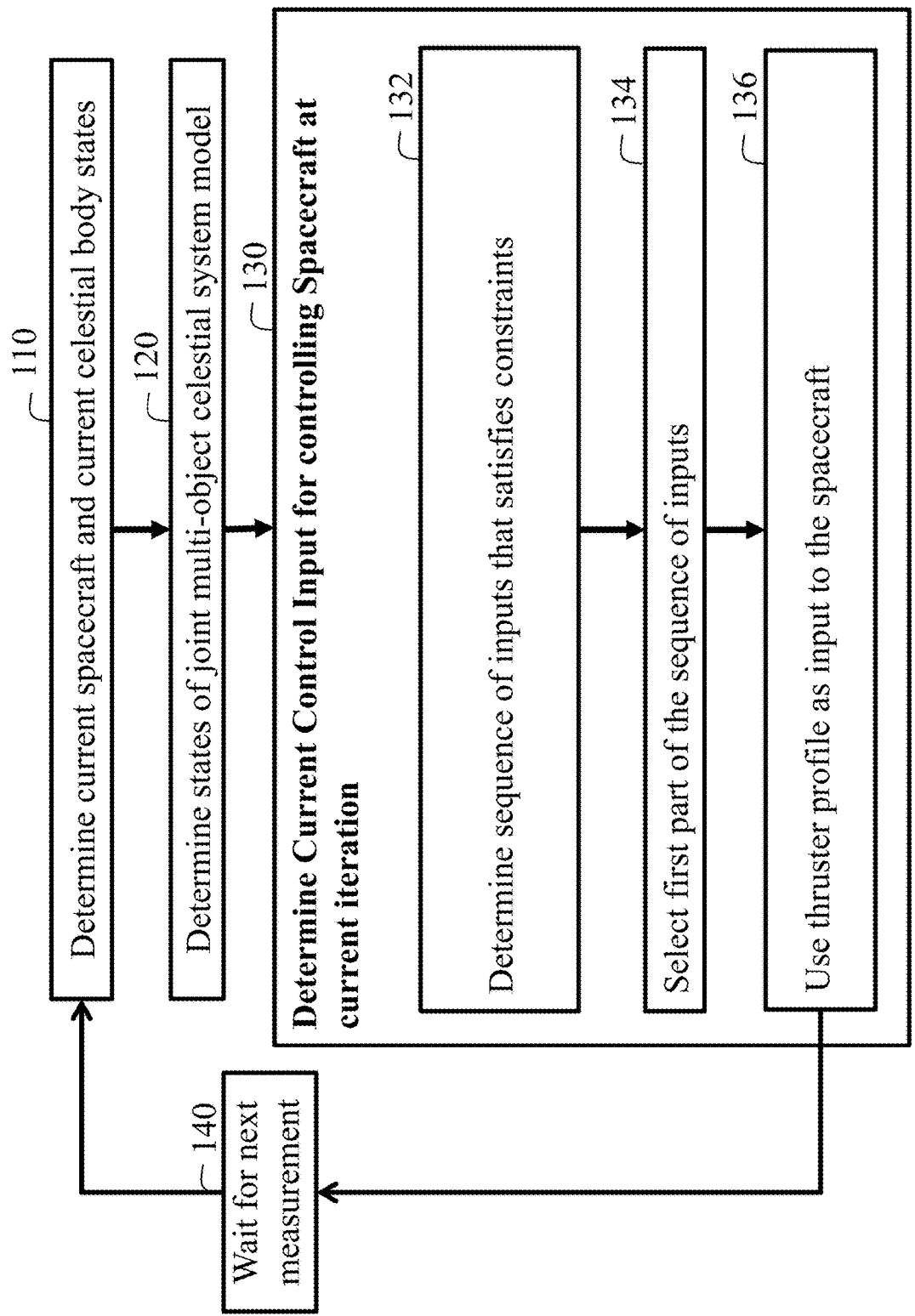
FIG. 1C is a block diagram illustrating a method for controlling an operation of a joint multi-object celestial system, according to some embodiments.
Figure 1D:
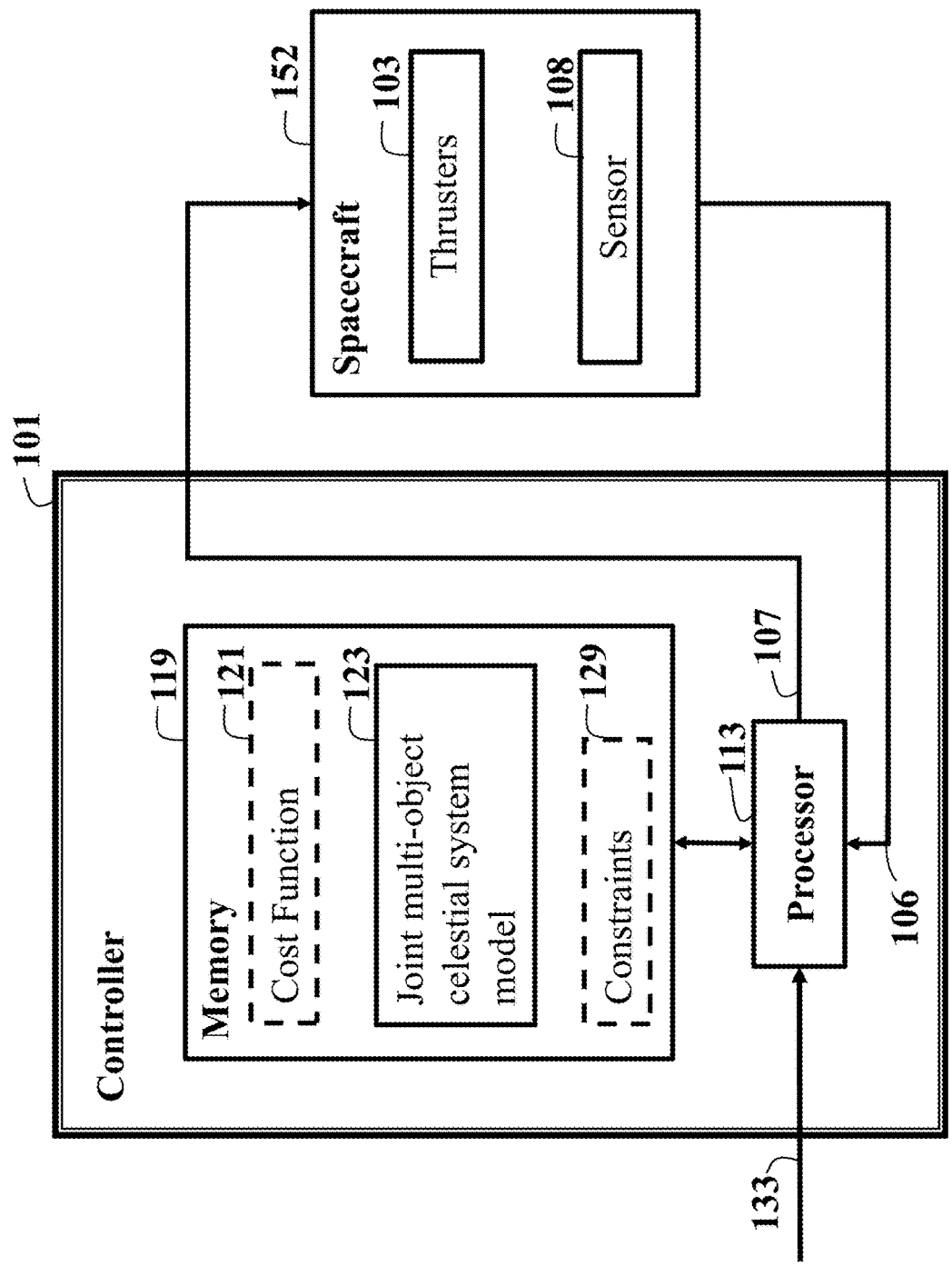
FIG. 1D is a block diagram illustrating some components of a controller implementing at least some steps of the method of FIG. 1C, according to some embodiments.

FIG. 1C is a block diagram illustrating a method of FIG. 1C for controlling an operation of a joint multi-object celestial system, according to some embodiments. FIG. 1D is a block diagram illustrating some components of a controller 101 implementing at least some steps of the method of FIG. 1C of FIG. 1C, according to some embodiments. Method 100C controls iteratively the operation of the controlled chaser spacecraft with control inputs determined using a model of the joint multi-object celestial system, comprising of a model of the uncontrolled celestial body 150 embedded into the model of the controlled chaser spacecraft 152, based on an optimization of a cost function.

Method 100C in FIG. 1C, initially begins with step 110 determining current states of the controlled chaser spacecraft and uncontrolled celestial body, of which, the current states of the spacecraft and uncontrolled celestial body can be determined using sensors (108 of FIG. 1D), or other aspects such as hardware or software. In addition, the current states of the spacecraft and uncontrolled celestial body can be obtained from communication with a ground command center located on Earth or another spacecraft located in outer space, e.g. GPS, relative range measurements, star trackers, horizon sensors, or the like. It is also possible to determine the current spacecraft state based on a previous control input determined for a previous iteration that is optimized with a previous cost function using a previous model of the spacecraft.

The states determined in 110 may be absolute states relative to the central body that the uncontrolled body and the controlled chaser spacecraft are orbiting. In this case, the next step 120 of FIG. 1C utilizes the absolute states to form the relative states used in the embedded error coordinate formulation of the joint kinematics and joint dynamics of the multi-object celestial system. The current states of the embedded error coordinate formulation may also be observed directly using sensors that measure the error coordinates directly. In this case, step 110 may be omitted and the method initially begins with step 120.

Additionally, or alternatively, in some implementations, the controller 101 includes an input interface 133 configured to accept data indicative of current values of states of the controlled spacecraft and the uncontrolled celestial body in the multi-object celestial system aim to be determined and/or determined in step 110 and/or 120 implemented outside of the controller 101. As used herein, the states include one or combination of positions, orientations, and translational and angular velocities of the controlled spacecraft and the uncontrolled celestial body, and perturbations acting on the multi-object celestial system.

Next, the method step 130 determines a current control input for controlling the spacecraft at the current iteration using the current model of the joint multi-object celestial system dynamics. The method uses the current model of the joint multi-object celestial system dynamics for step 132 to determine a sequence of future inputs of thruster forces from the current time instant for a fixed amount of time in the future, so long as to at least obtain new state measurements. So that, the predicted future spacecraft states and inputs satisfy the constraints on the operation of the spacecraft and constraints on the control inputs. The next step 134, includes the first part of the input sequence, for a duration equal to an amount of time needed to obtain a new measurement of the state of the spacecraft. Which is selected and applied to the next step 136, as the current control input to the spacecraft. Based on the determined current state of the controlled chaser spacecraft and uncontrolled celestial body step 110 and the determined current control input step 130 to the spacecraft, a next state of the controlled chaser spacecraft and uncontrolled celestial body are determined, and at step 140, the controller waits until a new state measurement is received.

FIG. 1D is a block diagram illustrating some components of the controller for implementing the method of FIG. 1C, according to embodiments of the present disclosure. Method of FIG. 1C can include a control system or controller 101 that has at least one processor 113 for executing modules of the controller. The controller 101 can be in communication with a processor 113 and a memory 119. Wherein the memory can have at least one stored thereon including the cost function 121, the joint multi-object celestial system model 123, and the constraints 129. The constraints can represent physical limitations of the spacecraft 152, safety limitations on the operation of the spacecraft 152, and performance limitations on a trajectory of the spacecraft 152.

Further, method of FIG. 1C can determine control inputs 107 via the processor 113, using the model of the joint multi-object celestial system 123 subject to the constraints. Wherein the determined control inputs 107 can be sent to the spacecraft 102. To that end, the controller 101 can included or be operatively connected to an output interface configured to submit the control commands 107 to the thrusters of the spacecraft. Further the spacecraft 152 can have thrusters 103 and sensors 108, among other components. The current state 106 of the spacecraft 152 can be obtained from the sensors 108 and communicated to the processor 113.

In at least one embodiment, the processor 113 can determine at least one of the cost function 121, the joint multi-object celestial system model 123, the constraints 129 during the control. For example, the control system 101 can execute method of FIG. 1C that controls iteratively the operation of the spacecraft 152 with control inputs of step 130 of FIG. 1C determined using the model 123 of the joint multi-object celestial system, based on an optimization of a cost function. It is contemplated that method of FIG. 1C could also be executed by the controller 101 based on a previously iteratively operation of the spacecraft 152, i.e. from a previously iterative control operation having a previous control input determined for a previous iteration that is optimized by a previous cost function using a previous model of the spacecraft.

Figure 2:
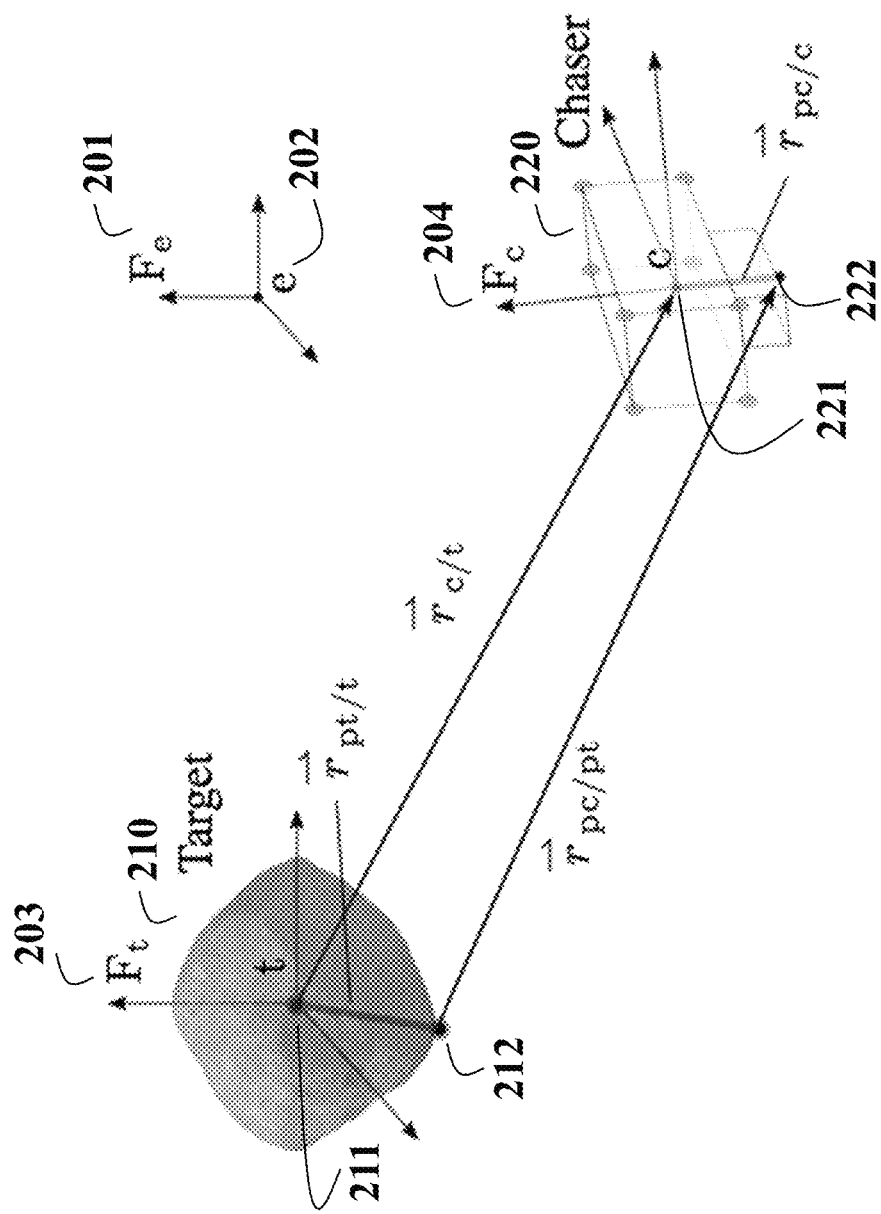
FIG. 2 is a schematic of a multi-object celestial system according to some embodiments.

FIG. 2 is a schematic of a multi-object celestial system according to some embodiments. This schematic shows the relationship between the non-center-of-mass point on the controlled chaser spacecraft (chaser) and the non-center-of-mass point on the uncontrolled celestial body (target). Referring to FIG. 2, an uncontrolled target celestial body 210 and a controlled chaser spacecraft 220 are in orbit around a central body. Without loss of generality, that central body is Earth. The frame 201 is the Earth Centered Inertial (ECI) frame, 202 is an unforced particle, and it is assumed that 202 is collocated with the center of the Earth. The target's, i.e., celestial body, center of mass is 211 and has a target-fixed frame 203. The target celestial body 210 has a rock on the surface at point 212. The chaser's spacecraft center of mass is 221 and has a chaser-fixed frame 204. The controlled chaser spacecraft has a robotic manipulator with an end effector at point 222. The points 212 and 222 are typically known in advance.

Still referring to FIG. 2, due to the objective of rendezvous between the non-center-of-mass points 212 and 222, the model exhibits kinematic coupling, that is, the orientation of both the controlled chaser spacecraft 220 and the orientation of the uncontrolled target body 210 affect the spatial positions of the non-center-of-mass points 222 and 212. As the objective of the regulation control problem is to bring the relative distance between 212 and 222 to zero, the spatial distance between the non-center-of-mass points 222 and 212 is a combination of the spatial distance between the uncontrolled celestial body 210 and the controlled chaser spacecraft 220 as well as the orientation of the uncontrolled celestial body 210 and orientation of the controlled chaser spacecraft 220.

Figure 3:
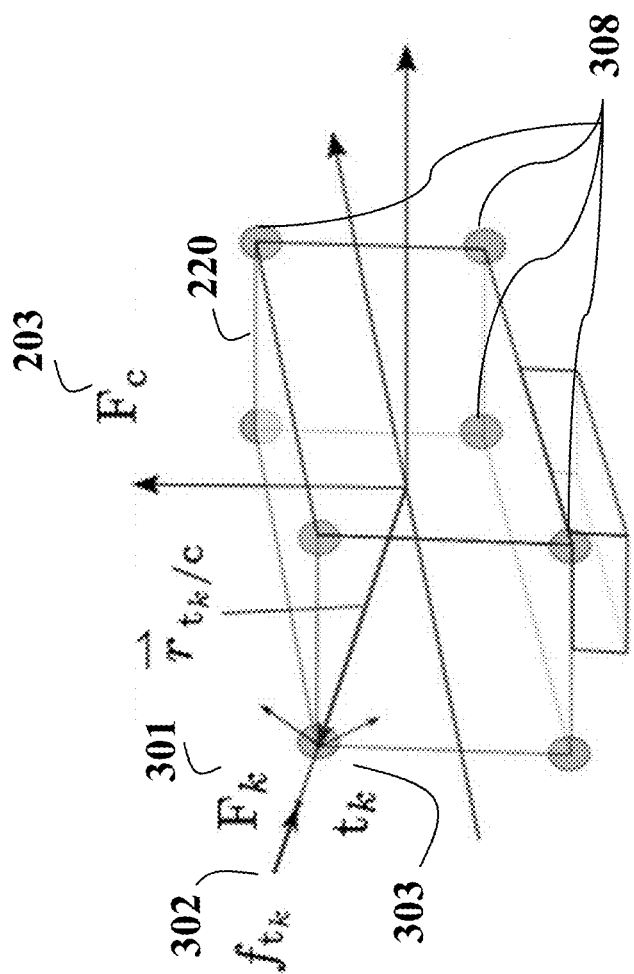
FIG. 3 is a schematic of thruster configuration according to one embodiment.

FIG. 3 is a schematic of thruster configuration according to one embodiment. In this embodiment, the controlled chaser spacecraft 220 is a rectangular cuboid equipped with eight thrusters 308 mounted on the corners of two faces of the satellite. Each thruster has a frame 301, with an origin at point 303 for thrusters. The thrusters provide force 302 in a line coincident with their position and the center of mass of the satellite, but are able to gimbal away from this nominal direction. Each thruster 308 produces a force 302 to change the position of the spacecraft 220 as well as a torque to rotate the spacecraft 220. Because the thrusters 308 affect both the rotational and translational motion of the spacecraft 220 there is dynamic coupling between rotation and translation.

Figure 4:
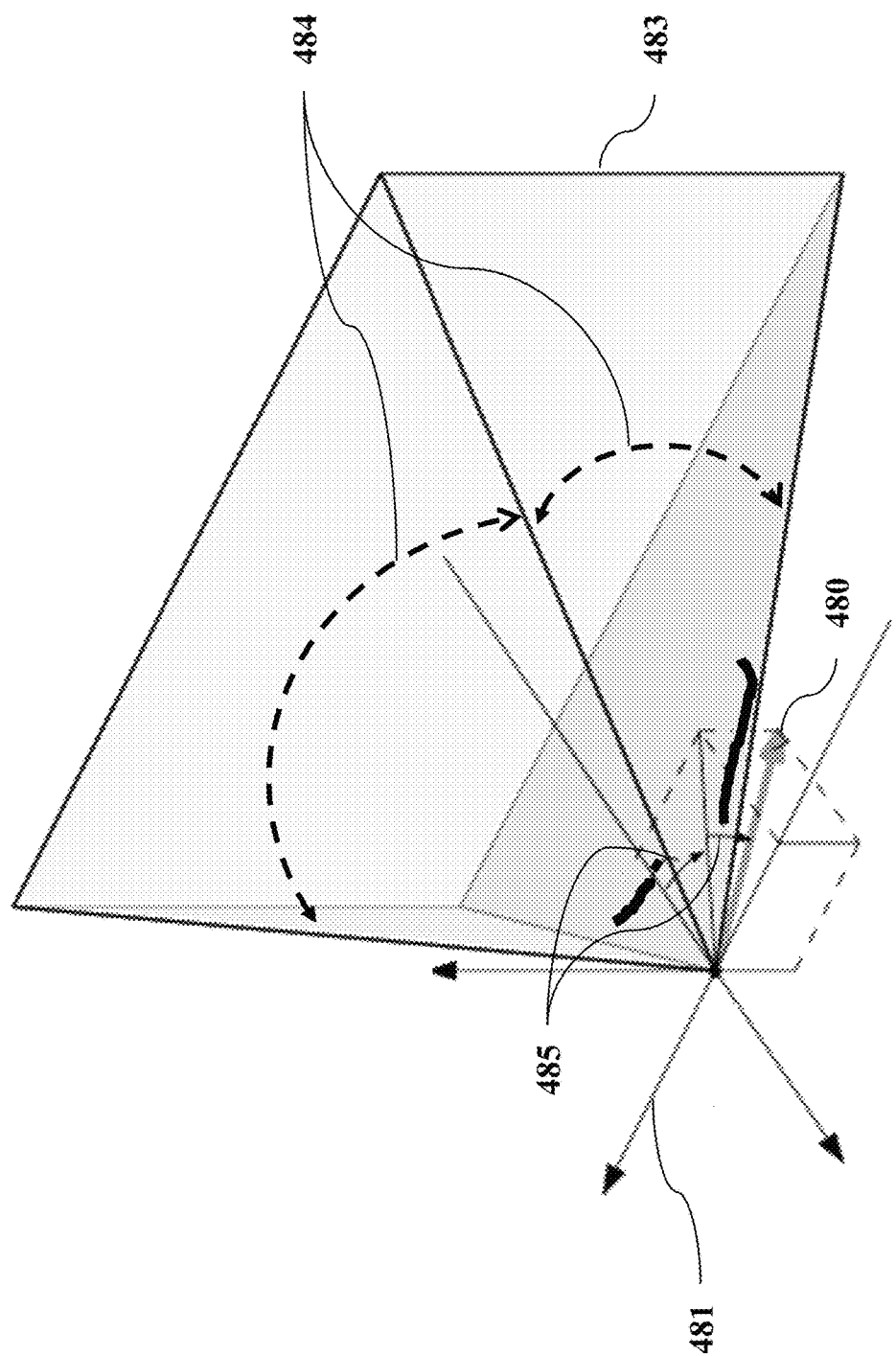
FIG. 4 is a schematic of the gimbaling constraints on an individual thruster according to one embodiment.

FIG. 4 is a schematic of the gimbaling constraints on an individual thruster according to one embodiment. FIG. 4 shows a thrust force 180 generated by a thruster gimbaled from its nominal alignment. In this particular case, the thrust force is to be obtained by a thruster that is double gimbaled by two angles 185 that happen to be larger than the permitted gimbal angles 184. The gimbal angles 184 form the dimensions of a pyramid 183 and either due to the physical range or the permitted range of the gimbals, the thrust 180 must lie in the interior of the pyramid.

Figure 5:
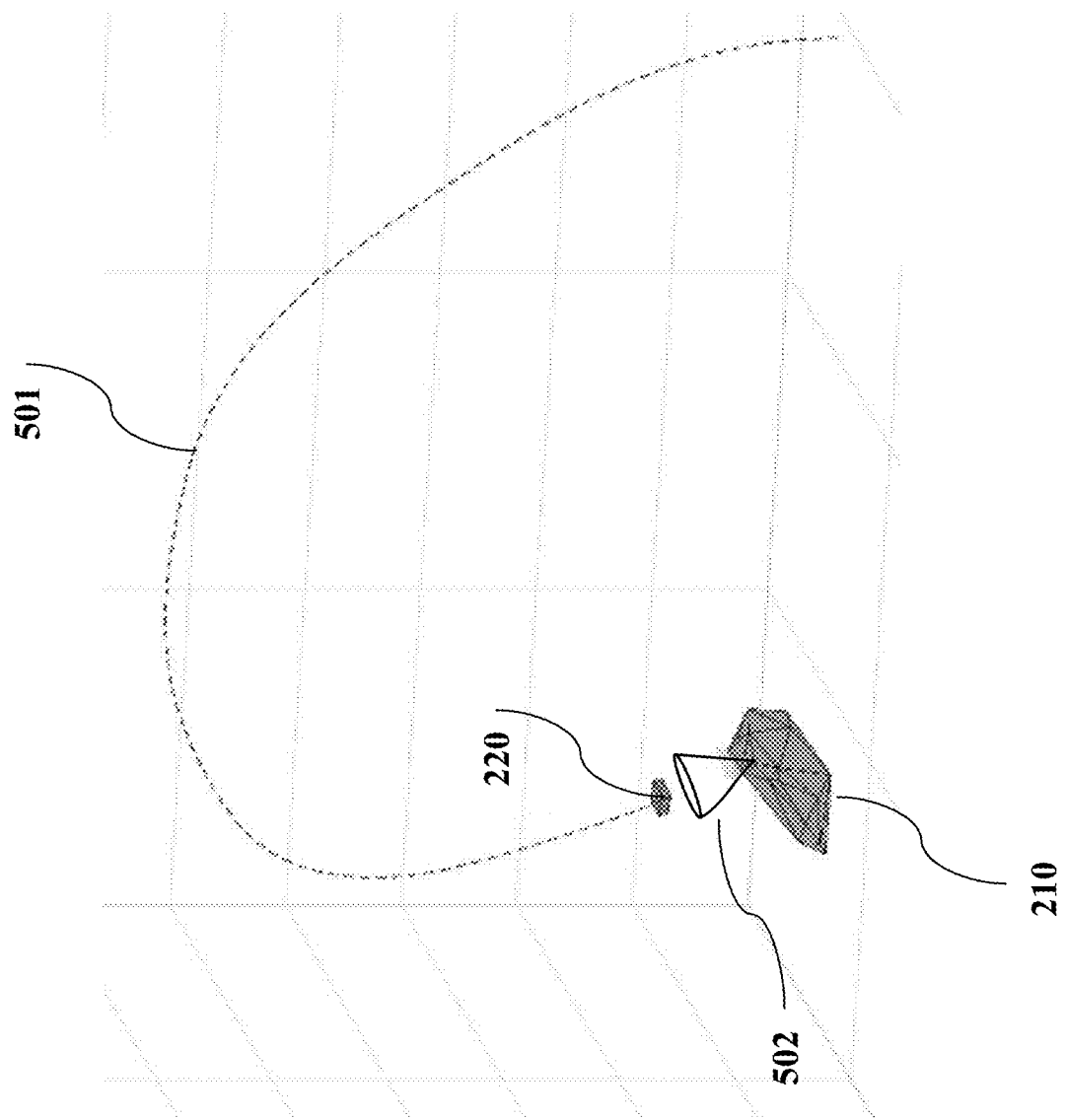
FIG. 5 is a schematic of the line-of-sight (LOS) constraint that ensures that the controlled chaser spacecraft approaches the uncontrolled celestial body via a LOS cone according to some embodiments.

FIG. 5 is a schematic of the line-of-sight (LOS) constraint that ensures that the controlled chaser spacecraft approaches the uncontrolled celestial body via a LOS cone according to some embodiments. FIG. 5 shows a trajectory 501 of the controlled chaser spacecraft 220 that is penalized for positions that lie outside of a line-of-sight (LOS) cone 502 from the non-center-of-mass point on the uncontrolled celestial body 210. The NMPC is rewarded for generating trajectories 501 that move into the interior of the LOS cone as the controlled chaser spacecraft 220 rendezvous with the uncontrolled celestial body 210.

Figure 6:
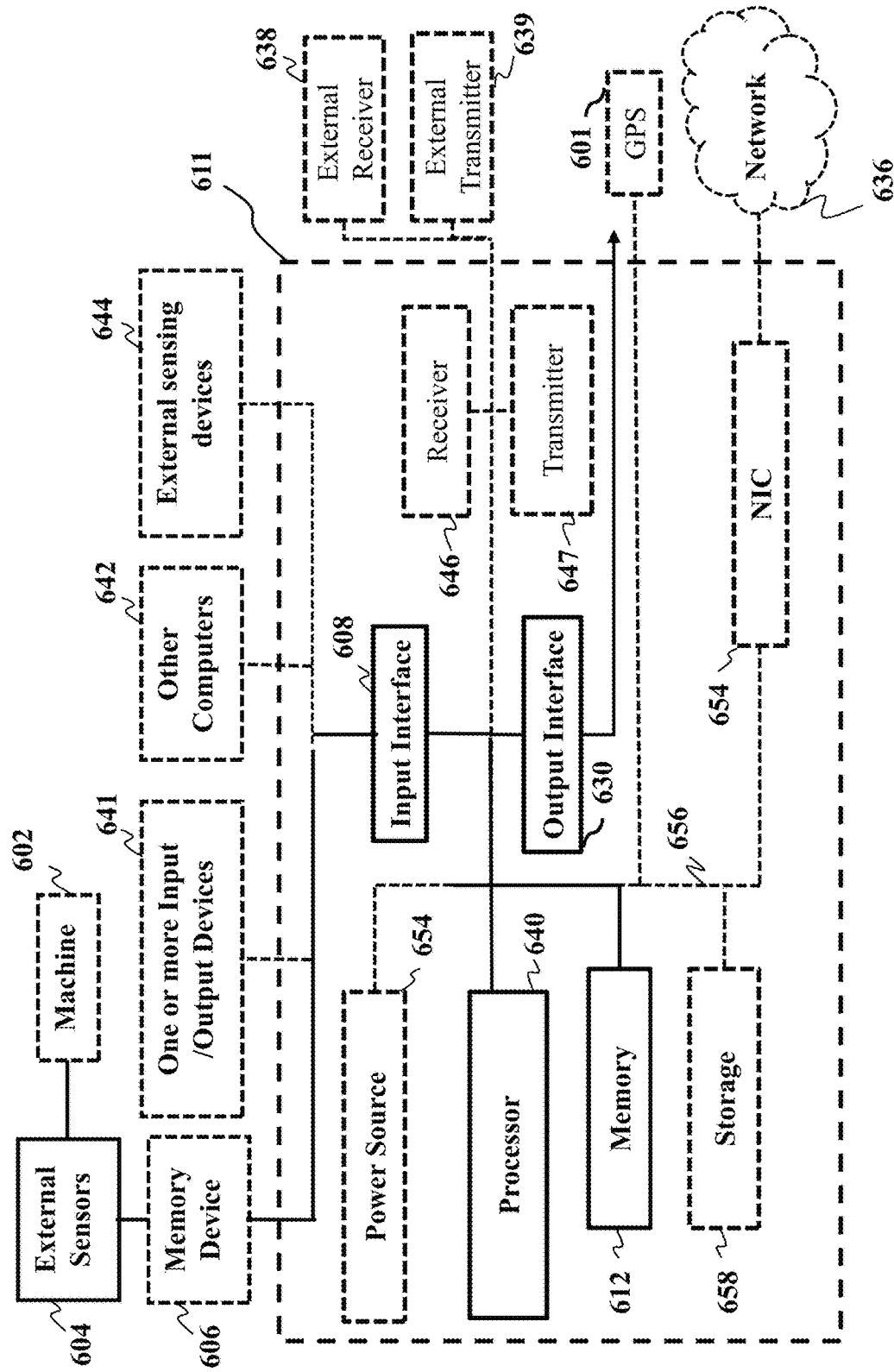
FIG. 6 is a block diagram of illustrating the method of FIG. 1C, that can be implemented using an alternate computer or processor, according to embodiments of the present disclosure.

FIG. 6 is a block diagram of illustrating the method of FIG. 1C, that can be implemented using an alternate computer or processor, according to embodiments of the present disclosure. The computer 611 includes a processor 640, computer readable memory 612, storage 658 connected through bus 656.

Contemplated is that the memory 612 can store instructions that are executable by the processor, historical data, and any data to that can be utilized by the methods and systems of the present disclosure. The processor 640 can be a single core processor, a multi-core processor, a computing cluster, or any number of other configurations. The processor 640 can be connected through a bus 656 to one or more input and output devices. The memory 612 can include random access memory (RAM), read only memory (ROM), flash memory, or any other suitable memory systems.

A storage device 658 can be adapted to store supplementary data and/or software modules used by the processor. For example, the storage device 658 can store historical device data and other related device data such as manuals for the devices, wherein the devices are sensing device capable of obtaining measured data as mentioned above regarding the present disclosure. Additionally, or alternatively, the storage device 658 can store historical data similar to sensor data. The storage device 658 can include a hard drive, an optical drive, a thumb-drive, an array of drives, or any combinations thereof.

The computer 611 can include a power source 654, depending upon the application the power source 654 may be optionally located outside of the computer 611. A network interface controller (NIC) 634 is adapted to connect through the bus 656 to a network 636, wherein sensor data or other data, among other things.

The sensor data or other data, among other things, can be transmitted over a communication channel of the network 636, and/or stored within the storage system 658 for storage and/or further processing. Further, the sensor data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. The computer 611 may be connected via an input interface 608 to external sensing devices 644 and external input/output devices 641. The computer 611 may be connected to other external computers 642. An output interface 609 may be used to output the processed data from the processor 640.

Exemplar Equations of the Joint Multi-Object Celestial System Model

According to an embodiment of the present disclosure, an uncontrolled target celestial body and a controlled chaser spacecraft are in orbit around a central body. Without loss of generality, that central body is Earth. The frame $F_e$ is the Earth Centered Inertial (ECI) frame, e is an unforced particle, and it is assumed that e is collocated with the center of the Earth. The uncontrolled celestial body's center of mass is denoted by t and has a target-fixed frame $F_t$. The uncontrolled celestial body has a rock on the surface at point pt. The chaser's center of mass is denoted by c and has a chaser-fixed frame $F_c$. The controlled chaser spacecraft has a robotic manipulator with an end effector at point pc. The controlled chaser spacecraft is a rectangular cuboid equipped with eight thrusters mounted on the corners of two faces of the satellite. Each thruster has a frame $F_k$, with an origin at point $t_k$ for thrusters k=1, . . . , 8. The thrusters provide thrust in a line coincident with their position and the center of mass of the satellite, but are able to gimbal away from this nominal direction. The uncontrolled celestial body and controlled chaser spacecraft configurations lie in the special Euclidean group $SE(3)=SO(3)\times R^3$, that is, the set of all rotations and translations of a rigid body.

Embedding the Rotational Dynamics

The uncontrolled celestial body and controlled chaser spacecraft's attitude are given by Poisson's equation $$\dot{R}_{t/e} = R_{t/e}\omega_{t/e}^{t\times},$$
$$\dot{R}_{c/e} = R_{c/e}\omega_{c/e}^{c\times},$$

(1)

Where $$\omega_{\{t,c\}/e}^{\{t,c\}} \in \mathbb{R}^3$$

are the angular velocities of the uncontrolled celestial body and controlled chaser spacecraft frames $F_{\{t,c\}}$ with respect to the inertial frame $F_e$ resolved in the respective target and chaser frames $F^{\{t,c\}}$, $\omega^\times$ is the cross-product matrix of $\omega$, and $R_{\{t,c\}/e} \in SO(3)$ are the rotation dyadics that transforms the inertial frame $F_e$ into the target and chaser frames $F_{\{t,c\}}$. Therefore, $R_{\{t,c\}/e}$ are the proper orthogonal matrices (that is, the rotation matrices) that transform the components of vectors resolved in the target and chaser frames into the components of the same vector resolved in the inertial frame.

The dynamics of the uncontrolled celestial body and controlled chaser spacecraft are given by Euler's equation $$\dot{\omega}_{t/e}^t = J_t^{-1}(J_t\omega_{t/e}^t \times \omega_{t/e}^t + \tau_p^t), \quad (2)$$
$$\dot{\omega}_{c/e}^c = J_c^{-1}(J_c\omega_{c/e}^c \times \omega_{c/e}^c + \tau_p^c + \tau_c^c),$$

where $J_t, J_c \in \mathbb{R}^{3\times 3}$ are the moment of inertia matrices $\{t,c\}$ of the target and chaser respectively, $\tau_p \in \mathbb{R}$ represent the perturbation torques applied to the target and chaser, and $\tau_c \in \mathbb{R}^3$ are the control torques applied to the chaser from the thrusters, all resolved in their respective frames.

Since the objective of the controlled chaser spacecraft is to match the attitude of the uncontrolled celestial body, let the relative attitude-error rotation matrix between the controlled chaser spacecraft and uncontrolled celestial body be given by $R_{c/t} = R_{t/e}^T R_{c/e}$, which satisfies the differential equation $$\dot{R}_{c/t} = R_{c/t}\omega_{c/t}^{t\times}, \quad (3)$$

where the angular velocity error $\omega_{c/t}^t$ is defined as $$\omega_{c/t}^t \triangleq \bar{\omega}_{c/t}|_t = \bar{\omega}_{c/e}|_t - \bar{\omega}_{t/e}|_t = R_{c/t}\omega_{c/e}^c - \omega_{t/e}^t.$$

Taking the derivative of $\omega_{c/t}^t$ with respect to $F_t$, substituting in the uncontrolled celestial body and controlled chaser spacecraft dynamics $\dot{\omega}_{c/e}^c$, $\dot{\omega}_{t,e}^t$ given in (2), and resolving into the target frame $F_t$ yields, $$\dot{\omega}_{c/t}^t = R_{c/t}\dot{\omega}_{c/e}^c - \dot{\omega}_{t/e}^t + \omega_{c/t}^t \times \omega_{c/e}^t, \quad (4)$$
$$= R_{c/t}J_c^{-1}(J_c\omega_{c/e}^c \times \omega_{c/e}^c + \tau_p^c + \tau_c^c) - $$
$$J_t^{-1}(J_t\omega_{t/e}^t \times \omega_{t/e}^t + \tau_p^t) + $$
$$\omega_{c/t}^t \times (R_{c/t}\omega_{c/e}^c),$$

which, along with (3), completes the embedding of the attitude kinematics and dynamics of the uncontrolled celestial body into the attitude kinematics and dynamics model of the controlled chaser spacecraft.

Embedding the Translational Dynamics

The translational equations of motion for the uncontrolled celestial body and controlled chaser spacecraft relative to the inertial frame $F_e$ are given by $$\ddot{r}_{t/e}^e = -\mu\frac{r_{t/e}^e}{|r_{t/e}^e|^3} + \frac{f_p}{m_t}, \quad (6)$$

$$\ddot{r}_{c/e}^e = -\mu\frac{r_{c/e}^e}{|r_{c/e}^e|^3} + \frac{f_p}{m_c} + R_{c/e}\frac{f_c}{m_c},$$

where $$r_{\{t,c\}/e}^e \in \mathbb{R}^3$$

are the position vectors of the uncontrolled celestial body and controlled chaser spacecraft center of mass relative to the center of their central body, $\mu$ is the gravitational constant of the central body, $f_p \in \mathbb{R}^3$ is the vector sum of orbital perturbations, $m_{\{t,c\}} \in \mathbb{R}$ are the target and chaser masses, and $f_c \in \mathbb{R}^3$ is the controllable force vector applied to the chaser in $F_c$.

According to an embodiment of the present disclosure, we consider body-fixed non-center-of-mass points pt on the uncontrolled celestial body and pc on the controlled chaser spacecraft, representing a surface rock and end effector, respectively. The relative distance between the controlled chaser spacecraft and uncontrolled celestial body feature points is given by $$\vec{r}_{pc/pt} = \vec{r}_{c/t} + \vec{r}_{pc/c} - \vec{r}_{pt/t}, \text{ tm (7)}$$

where $\vec{r}_{c/t} = \vec{r}_{c/e} - \vec{r}_{t,e} \in \mathbb{R}^3$ is the relative distance between the centers of mass of the uncontrolled celestial body and controlled chaser spacecraft rigid bodies, $\vec{r}_{pc/c} \in \mathbb{R}^3$, $\vec{r}_{pt/t} \in \mathbb{R}^3$, are the positions of the feature points on the controlled chaser spacecraft and uncontrolled celestial body, respectively. Taking the derivative with respect to the uncontrolled celestial body frame $F_t$ yields $$\dot{\vec{r}}_{pc/pt}^t = \dot{\vec{r}}_{c/t}^t + \dot{\vec{r}}_{pc/c}^c + \vec{\omega}_{c/t} \times \vec{r}_{pc/c} - \dot{\vec{r}}_{pt/t}^t. \quad (8)$$

Since the positions of the surface rock and end effector are fixed in their respective body-fixed target and chaser frames it follows that $$\dot{\vec{r}}_{pc/c}^c = \dot{\vec{r}}_{pt/t}^t = 0.$$

Taking the derivative of (8) with respect to the target frame $F_t$ and resolving into $F_t$ yields, $$\ddot{\rho}_{c/t}^t \triangleq \ddot{\vec{r}}_{pc/pt}^t|_t = \ddot{r}_{c/t}^t + \dot{\omega}_{c/t}^t \times (R_{c/t}r_{pc/c}^c) + \omega_{c/t}^t \times (\omega_{c/t}^t \times (R_{c/t}r_{pc/c}^c)), \quad (9)$$

where $\rho_{c/t}^t$ is the relative distance between the controlled chaser spacecraft and uncontrolled celestial body feature points and $\vec{r}_{c/t}^t$ is given by $$\ddot{r}^t_{c/t} = R^\top_{t/e}(\ddot{r}^e_{c/t} - \ddot{r}^e_{t/e}) - 2\omega^t_{t/e} \times (R^\top_{t/e}(\dot{r}^e_{c/e} - \dot{r}^e_{t/e})) - \quad (10)$$
$$\dot{\omega}^t_{t/e} \times (R^\top_{t/e}(r^e_{c/e} - r^e_{t/e})) + \omega^t_{t/e} \times (\omega^t_{t/e} \times (R^\top_{t/e}(r^e_{c/e} - r^e_{t/e}))).$$

Equation (9) is the relative translational dynamics model of the feature points pc, pt where the translational dynamics model of the uncontrolled celestial body is embedded into the translational dynamics model of the controlled chaser spacecraft. Since the feature points are not located at the centers of mass of their respective bodies, their rotational motion about their own center of mass projected onto the translational space, kinematically couples (9) with the relative attitude kinematics (3) and dynamics (4) model via $R_{c/t}$ and $\omega_r$.

Thrusters

According to an embodiment of the present disclosure, in addition to kinematic coupling, the spacecraft relative motion model in the present disclosure exhibits dynamic coupling via the thruster configuration. Referring to FIG. 3, each thruster has a position $\vec{r}_{t_k/c}$. The nominal thrust direction lies along this vector. Each thruster frame $F_k$ has its $\hat{j}$ unit vector defined such that $\hat{j} = \vec{r}_{t_k/c}/|\vec{r}_{t_k/c}|$. Each force $f_{t_k}$ is applied at the point $t_k$. The total force due to the thrusters applied on controlled chaser spacecraft resolved in $F_c$ is given by $$f_c = \sum_{k=1}^{8} R_{k/c} f_{t_k}, \quad (11)$$

where $R_{k/c} \in SO(3)$ is the rotation matrix that resolves the forces from thruster frame $F_k$ to the chaser frame $F_c$. The torque produced by these thrusters relative to chaser's center of mass resolved in $F_c$ is given by $$\tau_c = \sum_{k=1}^{8} r_{t_k} \times R_{k/c} f_{t_k}. \quad (12)$$

NMPC Policy

Prediction Model

In some embodiments of the invention, the NMPC policy is obtained by consolidating the following model, state, input constraints. In order to achieve offset-free steady state against modeling error or disturbances, we include integral action on the error of the non-center-of-mass feature point on the controlled chaser spacecraft with respect to the uncontrolled celestial body, $$\dot{\xi} = \rho^t_{c/t}. \quad (14)$$

Then, the prediction model for the NMPC policy is formulated as $$\dot{x} = f(x, u) \quad (15)$$

where the state is $x = [R^\top_{c/t} \omega^{t\top}_{c/t} \rho^{t\top}_{c/t} \dot{\rho}^{t\top}_{c/t} \xi^\top]^\top$, the input vector $f_{ps}^\top = [f_{t_1}^\top \ldots f_{t_8}^\top]$ the thrust vectors of all thrusters, and f is obtained from the attitude error kinematics equation (3), the attitude error dynamics equation (4), equation (9) describing the acceleration of the feature point, using (11), (12) to define the controlled chaser spacecraft forces and torques from the thrust vectors in $f_{ps}$, and the integral action (14).

Constraints on Operation of the Spacecraft

In some embodiments of the invention, the thrusters 150 may be gimbaled in order to allow them to rotate a fixed amount from their nominal alignment with a thruster frame 181. Individual thrusters, however, have limited gimbal range of motion and are therefore constrained to lie in the interior of four planes represented by the linear constraints that form a pyramid 183. This constraint is given by $$A_k f_{t_k} \leq b_k, \quad (16)$$

where each of the four rows of $A_k$ contains a normal vector describing a plane.

In some embodiments of the invention, the total amount of thrust that can be produced by each thruster, i.e., the thrust magnitude constraint, is a euclidean norm constraint $$\|f_{t_k}\| \leq f_{max}. \quad (17)$$

In some embodiments of the invention, a line-of-sight (LOS) constraint imposes that the non-center-of-mass point on the controlled chaser spacecraft must remain in a line of sight region of the uncontrolled celestial body. In the present disclosure this is achieved by enforcing $\rho^t_{c/t}$ to remain in the polyhedron $$A\rho^t_{c/t} \leq b. \quad (18)$$

Cost Function

According to an embodiment of the present disclosure, the cost function includes a stage cost integrated along the prediction horizon, and of a terminal cost expressed on the state at the end of the horizon, encodes the control objectives. In the present disclosure, the controlled chaser spacecraft objective is for the non-center-of-mass point to reach and stay at the uncontrolled celestial body, thus attaining zero position and attitude error, with translational and angular velocities matching the uncontrolled celestial body. Furthermore, in order to reduce the weight or increase the payload, the use of propellant should be minimized, which we formulate as minimizing the forces and the torques to be produced by the propulsion system. Thus, the stage cost is formulated as $$F(x, u) := Q_R tr(D - DR^t_{c/t}) + \omega^{t\top}_{c/t} Q_\omega \omega^t_{c/t} + \quad (20)$$
$$\rho^{t\top}_{c/t} Q_\rho \rho^t_{c/t} + \xi^\top Q_\xi \xi + \tau^\top_c W_\tau \tau_c + f^\top_{ps} W_f f_{ps}$$

where $Q_R$, $Q_\omega$, $Q_\rho$, $Q_\xi$, are matrix weights for the states, D is a diagonal positive definite matrix, and $W_\tau$, $W_f$ are matrix weights for the control inputs.

According to an embodiment of the present disclosure, the terminal cost given by $$E(x) := [\rho^{t\top}_{c/t} \dot{\rho}^{t\top}_{c/t}]^\top P [\rho^t_{c/t} \dot{\rho}^t_{c/t}], \quad (21)$$

where P is a matrix weight.

Optimal Control Problem and NMPC Policy

According to an embodiment of the present disclosure, the NMPC policy is based on solving in a receding horizon fashion the optimal control problem formulated based on the dynamics (15), constraints (19), and cost function with stage cost (20) and terminal cost (21), $$\min_{u(\cdot|t)} E(x(T|t)) + \int_0^T F(x(\tau/t), u(\tau|t)) d\tau \quad (22)$$
$$\text{s.t. } \dot{x}(\tau|t) = f(x(\tau|t), u(\tau|t))$$
$$x(0|t) = x(t)$$
$$g(x(\tau|t), u(\tau|t)) \leq 0$$

According to an embodiment of the present disclosure, in order to solve (22) numerically, the embodiment restricts the input to be a piecewise constant function by defining N intervals, $[t_i, t_i+1]$, $i \in \{0,1,2 \ldots, N-1\}$, $t_0=0$, $t_N=\tau$, $t_i+1-t_i=T_s=T$, and imposing $u(\tau|t)=u(t_i|t)$, for N all $\tau \in [t_i, t_i+1]$. The NMPC policy $$u(t)=\kappa_{mpc}(x(t)), \qquad (23)$$

is obtained by computing the optimal solution $u^*(\cdot|t)$ of (22) every $T_s$ seconds and applying $u(t+\tau)=u^*(\tau|t)$, for all $\tau \in [0, T_s)$. Various embodiments of the invention solve problem (22) to obtain (23) by various methods, such as sequential quadratic programming, projected gradient, solution of inverse optimality condition, gradient-free optimization methods, using available software packages such as, for instance, IPOPT, CVX, PRESAS, GPOPS, GUROBI.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A controller to control a spacecraft to rendezvous a non-center-of-mass point of the controlled spacecraft with a non-center-of-mass point of an uncontrolled celestial body, wherein the controlled spacecraft and the uncontrolled celestial body form a multi-object celestial system, the controller comprising:
   an input interface configured to accept data indicative of current values of states of the controlled spacecraft and the uncontrolled celestial body in the multi-object celestial system, wherein the states includes one or combination of positions, orientations, and translational and angular velocities of the controlled spacecraft and the uncontrolled celestial body, and perturbations acting on the multi-object celestial system;
   a processor configured to produce control commands to thrusters of the controlled spacecraft using a non-linear model predictive control (NMPC) optimizing a cost function over a receding horizon that minimizes an error between coordinates of the non-center-of-mass point of the spacecraft and the non-center-of-mass point of the celestial body subject to joint dynamics of the multi-object celestial system coupled with joint kinematics of the multi-object celestial system; and
   an output interface configured to submit the control commands to the thrusters of the spacecraft.

2. The controller of claim 1, wherein the cost function is optimized subject to input constraints to enforce gimbal angle limits and magnitude limits on the thrusters and subject to output constraints to enforce a line-of-sight (LOS) regulation of the non-center-of-mass points.

3. The controller of claim 1, wherein the cost function includes a stage cost integrated along a prediction horizon and a terminal cost expressed on the state of the controlled spacecraft at the end of the prediction horizon to encode control objectives of the controlled spacecraft to have zero position and attitude errors of the non-center-of-mass point of the controlled spacecraft with respect to the non-center-of-mass point of the uncontrolled celestial body with the translational and angular velocities of the controlled spacecraft matching the translational and angular velocities of the uncontrolled celestial body.

4. The controller of claim 1, wherein the dynamics and kinematics of the uncontrolled celestial body are embedded into the dynamics and kinematics of the controlled spacecraft to form the joint multi-object celestial system controllable via the NMPC as a closed-loop regulation problem of the error coordinates between the non-center-of-mass point on the controlled spacecraft and the non-center-of-mass point on the celestial body.

5. The controller of claim 4, wherein embedding of the dynamics and kinematics of the uncontrolled celestial body into the dynamics and kinematics of the controlled spacecraft represents joint dynamics and kinematics of a relative attitude-error and a relative translational-error between the controlled spacecraft and the uncontrolled celestial body.

6. The controller of claim 1, wherein a spatial distance between the non-center-of-mass points of the controlled spacecraft and the uncontrolled celestial body is a function of a spatial distance between centers of mass of the uncontrolled celestial body and the controlled spacecraft, an orientation of the uncontrolled celestial body, and an orientation of the controlled spacecraft.

7. The controller of claim 1, wherein the controlled spacecraft is a rectangular satellite equipped with eight thrusters mounted on corners of two faces of the satellite.

8. A spacecraft comprising:
   a set of thrusters for changing a pose of the spacecraft; and
   the controller of claim 1 configured to produce the control commands for controlling the thrusters.

9. The spacecraft of claim 8, wherein the spacecraft has a rectangular shape and equipped with eight thrusters mounted on corners of two faces of the satellite, wherein the constraints on the inputs to the thrusters define a range of rotations of the thrusters forcing thrusts of the thrusters to lie within an interior of a pyramid.

10. A method for controlling a spacecraft to rendezvous a non-center-of-mass point of the controlled spacecraft with a non-center-of-mass point of an uncontrolled celestial body, wherein the controlled spacecraft and the uncontrolled celestial body form a multi-object celestial system, wherein the method uses a processor coupled with stored instructions implementing the method, wherein the instructions, when executed by the processor carry out steps of the method, comprising:
   accepting data indicative of current values of states of the controlled spacecraft and the uncontrolled celestial body in the multi-object celestial system, wherein the states includes one or combination of positions, orientations, and translational and angular velocities of the controlled spacecraft and the uncontrolled celestial body, and perturbations acting on the multi-object celestial system;
   producing control commands to thrusters of the controlled spacecraft using a non-linear model predictive control (NMPC) optimizing a cost function over a receding horizon that minimizes an error between coordinates of the non-center-of-mass point of the spacecraft and the non-center-of-mass point of the celestial body subject to joint dynamics of the multi-object celestial system coupled with joint kinematics of the multi-object celestial system; and submitting the control commands to the thrusters of the spacecraft.

11. The method of claim 10, wherein the cost function is optimized subject to input constraints to enforce gimbal angle limits and magnitude limits on the thrusters and subject to output constraints to enforce a line-of-sight (LOS) regulation of the non-center-of-mass points.

12. The method of claim 10, wherein the cost function includes a stage cost integrated along a prediction horizon and a terminal cost expressed on the state of the controlled spacecraft at the end of the prediction horizon to encode control objectives of the controlled spacecraft to have zero position and attitude errors of the non-center-of-mass point of the controlled spacecraft with respect to the non-center-of-mass point of the uncontrolled celestial body with the translational and angular velocities of the controlled spacecraft matching the translational and angular velocities of the uncontrolled celestial body.

13. The method of claim 10, wherein the dynamics and kinematics of the uncontrolled celestial body are embedded into the dynamics and kinematics of the controlled spacecraft to form the joint multi-object celestial system controllable via the NMPC as a closed-loop regulation problem of the error coordinates between the non-center-of-mass point on the controlled spacecraft and the non-center-of-mass point on the celestial body.

14. The method of claim 13, wherein embedding of the dynamics and kinematics of the uncontrolled celestial body into the dynamics and kinematics of the controlled spacecraft represents joint dynamics and kinematics of a relative attitude-error and a relative translational-error between the controlled spacecraft and the uncontrolled celestial body.

15. The method of claim 10, wherein a spatial distance between the non-center-of-mass points of the controlled spacecraft and the uncontrolled celestial body is a function of a spatial distance between centers of mass of the uncontrolled celestial body and the controlled spacecraft, an orientation of the uncontrolled celestial body, and an orientation of the controlled spacecraft.

* * * * *